United States Patent
Sprang

[19]
[11] Patent Number: 6,132,621
[45] Date of Patent: Oct. 17, 2000

[54] METHOD OF SELECTIVELY REMOVING ZINC FROM ACID EFFLUENTS

[75] Inventor: Wilhelmus Johanna Anthonius Maria Sprang, Maarssen, Netherlands

[73] Assignee: Bammens Groep B.V., Alblasserdam, Netherlands

[21] Appl. No.: 08/967,484

[22] Filed: Nov. 11, 1997

Related U.S. Application Data

[63] Continuation of application No. 08/584,627, Jan. 11, 1996, abandoned.

[30] Foreign Application Priority Data

Jan. 12, 1995 [NL] Netherlands ............................ 9500065

[51] Int. Cl.$^7$ ........................................................ C02F 1/42
[52] U.S. Cl. ........................... 210/670; 210/672; 210/684; 210/688
[58] Field of Search ...................................... 210/684, 688, 210/670, 672

[56] References Cited

U.S. PATENT DOCUMENTS

| | | | |
|---|---|---|---|
| Re. 29,680 | 6/1978 | Salem et al. .......................... | 260/2.1 R |
| 2,223,930 | 12/1940 | Griessbach et al. ..................... | 210/684 |
| 2,366,008 | 12/1944 | D'Alelio et al. ........................ | 210/24 |
| 2,591,573 | 4/1952 | McBurney et al. ..................... | 260/88.1 |
| 2,614,099 | 10/1952 | Bauman et al. ........................ | 260/88.1 |
| 2,723,245 | 11/1955 | Wheaton ................................. | 260/2.1 |
| 2,962,351 | 11/1960 | Stevenson .............................. | 210/684 |
| 3,118,831 | 1/1964 | Morris ................................... | 210/684 |
| 3,148,947 | 9/1964 | Fleischmann ........................... | 210/684 |
| 3,250,705 | 5/1966 | Levendusky ........................... | 210/684 |
| 3,252,920 | 5/1966 | Goren ..................................... | 210/684 |
| 3,582,504 | 6/1971 | Salem et al. ............................ | 260/2.1 |
| 3,656,893 | 4/1972 | Sloan ..................................... | 23/77 |
| 3,658,699 | 4/1972 | Ryan et al. ............................. | 210/33 |
| 3,796,316 | 3/1974 | Salem ..................................... | 210/189 |
| 3,903,237 | 9/1975 | Smith et al. ............................ | 423/54 |
| 4,032,420 | 6/1977 | Boldebuck et al. .................... | 204/181 |
| 4,189,381 | 2/1980 | Laferty et al. .......................... | 210/28 |
| 4,280,985 | 7/1981 | Yan ........................................ | 423/7 |
| 4,284,727 | 8/1981 | Boros et al. ............................ | 521/28 |
| 4,299,922 | 11/1981 | Holl et al. ............................... | 521/26 |
| 4,312,956 | 1/1982 | Chong et al. ........................... | 521/28 |
| 4,321,145 | 3/1982 | Carlson .................................. | 210/678 |
| 4,652,352 | 3/1987 | Saieva ................................ | 204/105 R |
| 4,853,130 | 8/1989 | D'Angelo et al. ...................... | 210/663 |
| 5,002,645 | 3/1991 | Eastland, Jr. et al. .................. | 210/688 |
| 5,118,478 | 6/1992 | Nyman et al. .......................... | 423/49 |
| 5,178,746 | 1/1993 | Darnall et al. ......................... | 205/287 |
| 5,246,591 | 9/1993 | Abolt et al. ............................ | 210/684 |
| 5,500,126 | 3/1996 | Fries ...................................... | 210/668 |

FOREIGN PATENT DOCUMENTS

| | | |
|---|---|---|
| 2 118 781 | 7/1972 | France . |
| 16 21 577 | 7/1971 | Germany . |
| 25 26 247 | 12/1976 | Germany . |
| 26 02 440 | 7/1977 | Germany . |
| 38 14 372 | 11/1989 | Germany . |
| 1 343 626 | 1/1974 | United Kingdom . |
| WO 81/00728 | 3/1981 | WIPO . |

*Primary Examiner*—Cynthia L. Nessler
*Attorney, Agent, or Firm*—Pennie & Edmonds LLP

[57] ABSTRACT

This invention relates to a method of selectively removing zinc from an effluent, wherein the effluent is passed over an anion exchange column under conditions at which negatively charged zinc complexes are adsorbed to the column material. Subsequently, the zinc is stripped with ammonia from the anion exchanger.

16 Claims, 2 Drawing Sheets

METHOD OF SELECTIVELY REMOVING ZINC FROM ACID EFFLUENTS

This is a continuation of application Ser. No. 08/584,627, filed Jan. 11, 1996, now abandoned.

BACKGROUND OF THE INVENTION

This invention relates to a method of selectively removing zinc from an acid solution, in particular from pickling baths as used in galvanizing plants. These acid based pickling baths comprise a high content of zinc ions and iron ions, while, moreover, traces of other metal ions are present.

Hot dip galvanizing is a method in which the surface of steel structures is treated and provided with a layer of zinc. This method comprises a dipping process in which the total structure is immersed in a bath of liquid zinc. Three types of hot dip galvanizing methods can be distinguished, namely dry galvanizing, wet galvanizing and continuous galvanizing. In case of continuous galvanizing steel is drawn directly from the rolling mill through a galvanizing bath. Before it is galvanized, the rolled steel is passed through a reducing atmosphere. In this process no use is made of pickling baths so that the present invention is not applicable to this continuous galvanizing process.

Wet galvanizing is a technique especially used in the United States of America. Dry galvanizing is mostly used in Europe.

Both techniques in general comprise the following process steps. A material or structure to be galvanized is degreased in a suitable bath at a temperature of about 70–80° C., often followed by rinsing the degreased product. Then pickling is carried out in a solution of a strong acid, preferably hydrochloric acid, although, for instance, sulfuric acid and phosphoric acid may be used as well. After the pickling step rinsing in general is also carried out. In order to avoid oxidation in the air or other undesirable processes, the pickled material is fluxed. This means that the material is immersed in a solution containing one or more protective salts. This solution may have both ambient temperature and a higher temperature of, e.g., 70° C. After immersion in the flux bath the material is dried, with the protective salts remaining on the material. Finally, the material can be galvanized. In a frequently used embodiment this is done by hot dip galvanizing at about 450° C. An alternative is, for instance, high temperature galvanizing in which the galvanizing step is performed at a temperature of about 530–570° C. or more.

Structural steel is generally supplied in the form of bright structural steel possessing a rolling skin and/or being rusted. The rolling skin is formed during hot rolling of the steel and is constituted by a hardly removable oxide layer. Rusting takes place under atmospheric conditions at both high and low temperature. Moreover, bright structural steel is protected in some cases by a thin layer of preserving oil intended to prevent rust from being formed during storage and transport. This layer of oil can be removed, for instance, by alkaline degreasing.

Degreasing is generally performed by a dipping operation in an alkaline solution or by a spraying operation in which an alkaline solution is sprayed onto the material to be galvanized. Besides, the alkaline degreasing step can be replaced by other degreasing steps known to those skilled in the art, e.g., by degreasing with acid or neutral cleaning.

After degreasing the oxide layers must be removed. The above rolling skin consists of FeO, $Fe_2O_3$ and $Fe_3O_4$ and passes into rust during prolonged storage. By pickling the steel this iron oxide solution is removed. Pickling usually comprises the treatment of the steel with a concentrated hydrochloric acid solution, although sulfuric acid and phosphoric acid baths may be used as well. The pickling baths comprise inhibitors or pickling inhibitors for preventing steel from being affected by the acid from the pickling bath. Usually, tertiary and secondary amines are applied as inhibitors.

When hydrochloric acid solutions are used in the pickling bath, the concentration of HCl should not be too high. Emission of hydrogen chloride in the form of hydrochloric acid vapors must be avoided, at least be limited.

The fluxing of the pickled steel has two important functions. In the first place, fluxing prevents rust from being rapidly formed (rust film). The second function of flux salts is the function as a flux so that the zinc can better interact with the steel surface.

The difference between wet and dry galvanizing only resides in the manner of fluxing. In case of wet galvanizing a flux layer floats like a foam blanket on the zinc bath containing liquid zinc. In case of dry galvanizing a flux bath is placed before the zinc bath. This flux bath may have ambient temperature or a temperature of about 70° C. After removal of the steel structure from a hot flux bath the water evaporates; when a cold flux bath is used, the flux must be dried in a drying oven. In both cases a flux layer is formed before it arrives at the zinc bath. In case of wet galvanizing a temperature gradient is present over the foam blanket so that especially thin material heats up more gradually and becomes warped less rapidly.

In case of dry galvanizing fluxing is usually carried out with a flux on the basis of a $ZnCl_2/NH_4Cl$ mixture, which flux has a cleaning effect and a surface tension-reducing effect. The foam blanket used in the wet galvanizing process may comprise a glycerol $NH_4Cl$ mixture.

Galvanizing takes place at a temperature of about 450° C.; high temperature galvanizing at 530–600° C. or more. In the bath containing molten zinc a number of additives is present to influence the layer thickness and to promote flowing off. The fluxed material is dipped into the zinc bath, maintained therein for a moment and then slowly drawn from the zinc bath. The layer thickness of the zinc on the steel is, as those skilled in the art know, determined by, inter alia, the temperature of the zinc bath, the dipping time, the reactivity of the steel and the composition of the zinc bath.

As stated above, the object of pickling is to free the steel of iron oxides, such as rolling skins that may be present. A pickling bath usually comprises a solution of concentrated hydrochloric acid to which pickling inhibitors and detergents have been added. In the course of time, the acid concentration in the pickling bath falls and the concentrations of iron, zinc and trace metal ions increase. As a result of the change in the composition of the pickling bath the pickling rate decreases and/or the bath becomes saturated, and in the long run the bath will have to be replaced.

The zinc ions mainly originate from stripping of already galvanized materials or structures rejected during quality control and of contaminated hoisting and hanging materials, e.g. traverse cells and cables. The other metal ions mainly originate from the steel to be pickled, from alloy layers and from the zinc bath, in which these metals are present as additives.

When the pickling capacity of the pickling bath becomes insufficient, the composition of the bath must be changed or replaced. Because of the high zinc content of the effluent then occurring, this product legally falls under chemical waste and/or can nowhere be delivered for processing. Therefore, the bath to be replaced is designated by the term "spent acid" or "saturated pickling acid".

In the last few years, the processing of this zinc-containing spent acid has increasingly caused problems. The transport and dumping of this waste product is more and more restrained by the authorities. Companies must look for alternatives in the form of reprocessing methods in order to reuse as many waste products as possible so that the effluent decreases.

It is an object of the present invention to solve or reduce the spent acid problem. In other words, it is an object: of the present invention to provide a method of removing zinc ions from a pickling bath used, in which the resulting flows can be reused as much as possible and the final effluent has the lowest possible volume.

As far as the composition is concerned, a pickling bath mainly comprises an aqueous solution in which up to about 150 g/l HCl is present in addition to Fe(II) ions and zinc ions in amounts up to maximally their saturation values. In use, the acid concentration in the bath is kept high by strengthening the bath with a concentrated hydrochloric acid solution (e.g. 30%) so that the chloride concentration in the bath will increase in the course of time. Besides, the pickling bath comprises traces of heavy metals (Mn, Cr, Ni, Cu, Pb, Sn, etc.) and small amounts of detergents and pickling inhibitors.

It is known that the removal of metals from a solution can be effected by using cation exchangers. It is difficult, however, to find a cation exchanger with which ions of a specific metal can be removed selectively, even if the conditions of exchange are adjusted critically. Moreover, in a very acid medium cation exchangers will nearly only be in the $H^+$ form.

Based on the exchange of zinc ions, the absorbing capacity of cation exchangers for zinc ions from an iron ion-containing solution at a pH of 0.5–4.0 is relatively low. Besides, in many cases the absorbing capacity for zinc strongly depends on the pH, in which connection a good capacity is not obtained until at pH values of about 3. It is further observed that the presence of $Fe^{2+}$ ions considerably decreases the capacity of the cation exchanger for zinc.

SUMMARY OF THE INVENTION

It has now been found that by using an anion exchanger zinc ions can be selectively removed from a strong acid solution having a high iron ion concentration. The invention makes use of the principle that zinc is a good complex former. Zinc is capable of forming with chloride ions a zinc chloride complex which is assumed to be negatively charged. According to the invention an anion exchanger is used which does not absorb or chemically bind positive metal ions but negatively charged metal complexes. The zinc chloride complex proves to be capable of being selectively bound to an anion exchanger.

More in particular, the invention relates to a method of selectively removing zinc from an effluent, e.g. saturated pickling acid, which effluent is passed over an anion exchange column under conditions at which the above zinc complexes are bound to the column material.

DETAILED DESCRIPTION OF THE INVENTION

Figure 1:
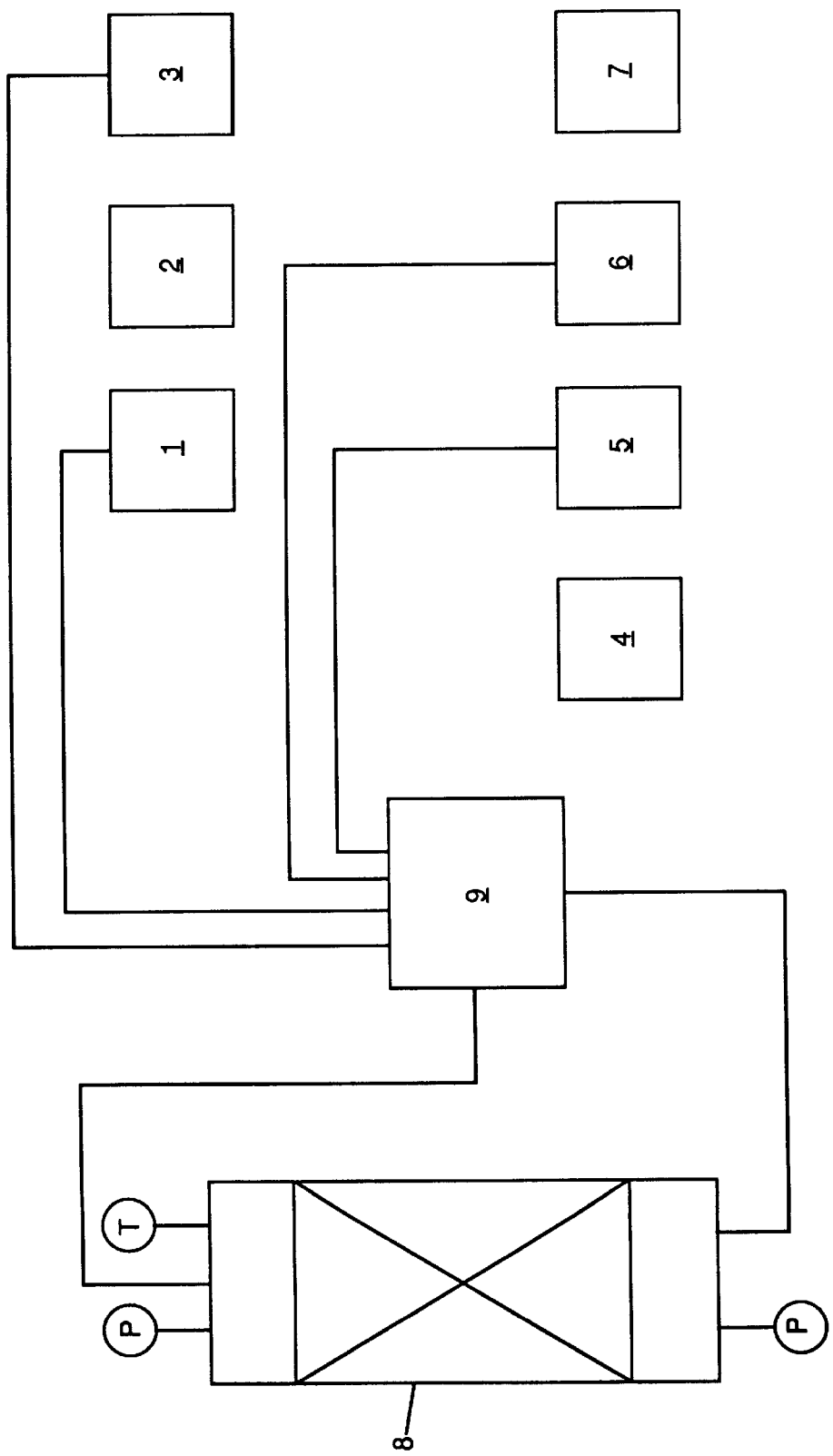
FIG. 1 diagrammatically shows the arrangement for carrying out the process according to the invention.

Preferably, complexes of zinc and chloride ions are adsorbed to the anion exchanger. Such complexes are formed in a chloride-containing effluent. In a preferred embodiment a liquid from a pickling bath, as used, for instance, in galvanizing plants, is passed over the anion exchange column.

Without wishing to be tied down to a theory, it is assumed that the following reactions occur in the solution in the pickling bath:

$$Zn^{2+} + Cl^- <=> ZnCl^+ \quad (1)$$

$$Zn^{2+} + 2\ Cl^- <=> ZnCl_2 \quad (2)$$

$$Zn^{2+} + 3\ Cl^- <=> ZnCl_3^- \quad (3)$$

$$Zn^{2+} + 4\ Cl^- <=> ZnCl_4^{2-} \quad (4)$$

Moreover, complexes of zinc, hydrogen and chlorine ions may be formed.

A search has revealed that in particular reaction (3) occurs to a considerable extent and that the monovalent negative zinc trichloride complex is the most frequently occurring zinc compound in the pickling bath medium.

Anion exchangers mainly comprise a carrier material to which active groups are bonded. The carrier material may be formed, for instance, by polymers and copolymers of styrene and divinylbenzene, which polymeric materials are provided with chloromethyl groups. Anion exchangers are not water-soluble.

Basic anion exchangers contain quaternary, tertiary, secondary or primary ammonium groups as well as mixtures thereof. Such anion exchangers can be obtained by exchanging the chlorine atoms of the introduced chloromethyl groups for the stated ammonium groups.

A preferred embodiment of the method according to the invention is characterized by using as column material a basic anion exchanger, in particular a material comprising tertiary and/or quaternary amines as functional groups. According to suppliers' specifications these anion exchangers may be used in a pH range of 0–8. It is surprising that in a medium that is much more acid (pH <0), and in which many negatively charged chloride ions are contained, such anion exchangers can nevertheless selectively remove zinc ions.

Suitable anion exchangers suitable for use in the method according to the invention are Lewatit MP-64, MP-64 WS, MP-64 ST, MP-62 (commercial products of Bayer), Amberlite IRA-420, Amberjet 4200 Cl, Duolite A368S (commercial products of Rohm and Haas), Purolite A-100 and Purolite A-845 (commercial products of Purolite). Preferably, Lewatit MP-64, MP-64 WS, Duolite A368S and Purolite A-100 are chosen as anion exchangers.

In the form in which the anion exchanger is present before loading the counterions employed may be all the counterions that can exchange with zinc chloride complexes. Examples thereof are chloride ions and hydroxyl ions. It has practical advantages if the anion exchanger to be used is in the OH⁻ form before loading.

After the effluent that contained high concentrations of zinc and iron ions has passed the column, the through-flow liquid proves to be chiefly free from zinc. Thus it turns out that a separation method has been found with which the zinc in the effluent can be substantially removed. The through-flow liquid obtained mainly comprises an acid aqueous solution of iron chloride in which traces of heavy metals are present. As long as this liquid has pickling capacity, it can be recirculated to the pickling bath.

More in detail, an iron ion-containing flow is formed, from which zinc has been substantially removed, which flow, in addition to a large amount of chloride ions, contains traces of heavy metals, such as lead, nickel and tin. The concentrations of these heavy metals vary between 0 and 2 g/l. If the pickling effect has become insufficient, the iron-containing solution can be used for a number of different applications. Thus a new fresh pickling bath liquid may be made from this solution. Furthermore, this solution can be used in the water purification, in particular for dephosphating and removing $H_2S$. On an industrial scale this solution can further be used as flocculant in precipitation processes, e.g. for precipitating $Ag_2S$ and in the manufacture of iron oxide for, e.g., cassette tapes. Besides, techniques for removing trace metals from an iron-containing effluent are known to those skilled in the art.

The anion exchanger can be loaded until the concentration of zinc ions in the through-flow liquid appreciably increases. This increase in the zinc ion concetration can be detected in any manner known to those skilled in the art, e.g. by using atomic absorption or ICP.

Depending on the column material and the structure of the column as well as the other process conditions the through-put of the column can be optimized by those skilled in the art.

Preferably, the method according to the invention is carried out at a temperature of 37° C. or more. The maximum temperature is determined by the column material which as a rule does not optimally function at temperatures above 70° C. Most preferably, the anion exchange step is carried out at a temperature ranging from 40 to 45° C. In this preferred temperature range the distribution coefficient for zinc ions turns out to be highest. The distribution coefficient is defined by the quotient of the concentration of the zinc to be absorbed on the ion exchanger and the concentration of that entity in solution.

In test arrangements the inventors have found that the capacity of the ion exchanger for zinc ions increases as the pH decreases and as the chloride concentration increases. This property of the basic anion exchangers to be used according to the invention partly explains the advantages of the present method.

When the anion exchanger is saturated, it is rinsed. The object of this rinsing step is to remove ions which during stripping of the column would form a precipitate with the stripping liquid and thus give rise to blockages. This rinsing step can be carried out with different liquids. Preferably, the rinsing liquid has the lowest possible stripping capacity.

When the column is first drained before rinsing, additional advantages are obtained, both in stripping effect and in the consumption of rinsing liquid.

A very suitable rinsing liquid is a hydrochloric solution, e.g. an aqueous 3–4 N HCl solution. This rinsing liquid is low-stripping and can be used after the rinsing step to strengthen the pickling bath. In order to prevent this flow from containing zinc ions, it is possible to allow this flow to pass an anion exchanger used according to the invention before it is added to the pickling bath. Water is less suitable as rinsing liquid because water has a stripping effect.

After this rinsing step the anion exchange column material is stripped. As indicated above, water and to a less degree hydrochloric acid have a stripping effect. However, the use of these liquids results in large volume flows having a relatively low concentration of zinc ions. Although this leads to diluted effluents that can be properly processed from the viewpoint of effluent problems, it is of great advantage if a high-stripping liquid is used, that is to say a liquid having a zinc-binding capacity considerably exceeding the zinc-binding capacity of the ion exchanger. Examples of such high-stripping liquids are ammonia and an aqueous solution having a high concentration of cation-binding complexing compounds, such as EDTA.

A preferred embodiment of the method according to the invention is characterized by the zinc complex-loaded anion exchange column being stripped with ammonia. Stripping with an aqueous ammonia solution has the advantage that the anion exchanger is regenerated at once. Moreover, zinc-ammonia complexes are formed, which complexing produces the stripping effect. Probably, $Zn(NH_3)_n^{2+}$ complex are formed. These complexes are properly soluble. Moreover, any zinc hydroxide precipitates formed rapidly dissolve so that these solids do not cause blockages in the column.

Depending on the ammonia concentration concentrated zinc solutions can be obtained. When an 8–10 molar ammonia solution is used, there can be obtained a zinc concentration of 100–150 g/l in the stripping solution. More in particular, a solution of zinc chloride and ammonium chloride salts is formed, which solution can be reused in the flux bath in the dry galvanizing process. Actually, in the flux bath there is generally used a zinc chloride-ammonium chloride double salt in ratios of, e.g., 1:2–1:6.

When wet galvanizing is applied, the stated stripping solution cannot be used in the flux step. In that case an ammonia solution of practically highest possible concentration is preferably used for stripping in order to obtain a lowest possible volume of the product flow.

When the anion exchanger is stripped and regenerated with an ammonia solution, there is preferably rerinsed with water or, if required, an acid solution. The reason for this is to expel ammonia residues from the column. This ammonia would otherwise find its way into the iron-containing through-flow liquid at the next loading charge so that this solution may cause problems in the processing of the saturated pickling acids.

The amount of chemical waste can be considerably lowered when carrying out the process according to the invention, and under optimum conditions it can even be reduced to practically zero, in particular because all the flows can be reused in the galvanizing process.

In an optimized system the pickling bath solution is passed over the anion exchange column when this bath contains such a zinc ion concentration that all the process flows in the total process household can be reused and/or supplied to third parties for other applications.

The invention will hereinbelow be described in more detail with reference to an example.

EXAMPLE

FIG. 1 diagrammatically shows the arrangement for carrying out the process according to the invention. This arrangement mainly comprises 7 liquid vessels 1–7 and an ion exchange column 8, as well as a tap block 9 and a number of conduits.

At the start of the charge the situation was as follows:

| | |
|---|---|
| Vessel 1: | (1000 liters) Contains untreated pickling acid; |
| Vessel 2: | (1000 liters) Is empty, the treated pickling acid is collected therein; |
| Vessel 3: | (1000 liters) Contains rinsing liquid (1), 3 N HCl in water; |
| Vessel 4: | (1000 liters) Collecting vessel rinsing liquid (1), this vessel can contain already collected liquid from a preceding charge; |
| Vessel 5: | (500 liters) Contains stripping liquid. At the start of the first charge the stripping solution contains 25% ammonia. Mounted on the vessel is a stirrer (not shown); |
| Vessel 6: | (1000 liters) Contains rinsing liquid (2), mains water; |
| Vessel 7: | (1000 liters) Collecting vessel rinsing liquid (2), this vessel can contain already collected liquid from a preceding charge; |

The ion exchange column 8 hat the following sizes: diameter 0.28 m; height 1.5 m; length/diameter 5.4; contents 92 l; maximum overpressure 1.1 bar.

At the bottom and at the top the column contains a filter plate having 50 holes. The bore of the holes in the lower filter plate is about 7 mm. The bore in the upper filter plate is about 15 mm. The plates are covered with a polypropylene filtering cloth. The permeability of the filtering cloth is 185 $\mu$m.

In the top and in the bottom cover a supply/discharge opening (16 mm) is located in the middle of the cover plate. Depending on the process stages, the opening is used for supply or discharge. Located at the lower and the upper side of the column is a "bourdon" manometer. The pressure gauge has a range of 0–2.5 bar overpressure. At the top side of the column the temperature is measured with an alcohol thermometer (−10 to 100° C.).

The column is filled with 100 kg Lewatit MP-64 (Bayer).

Figure 2:
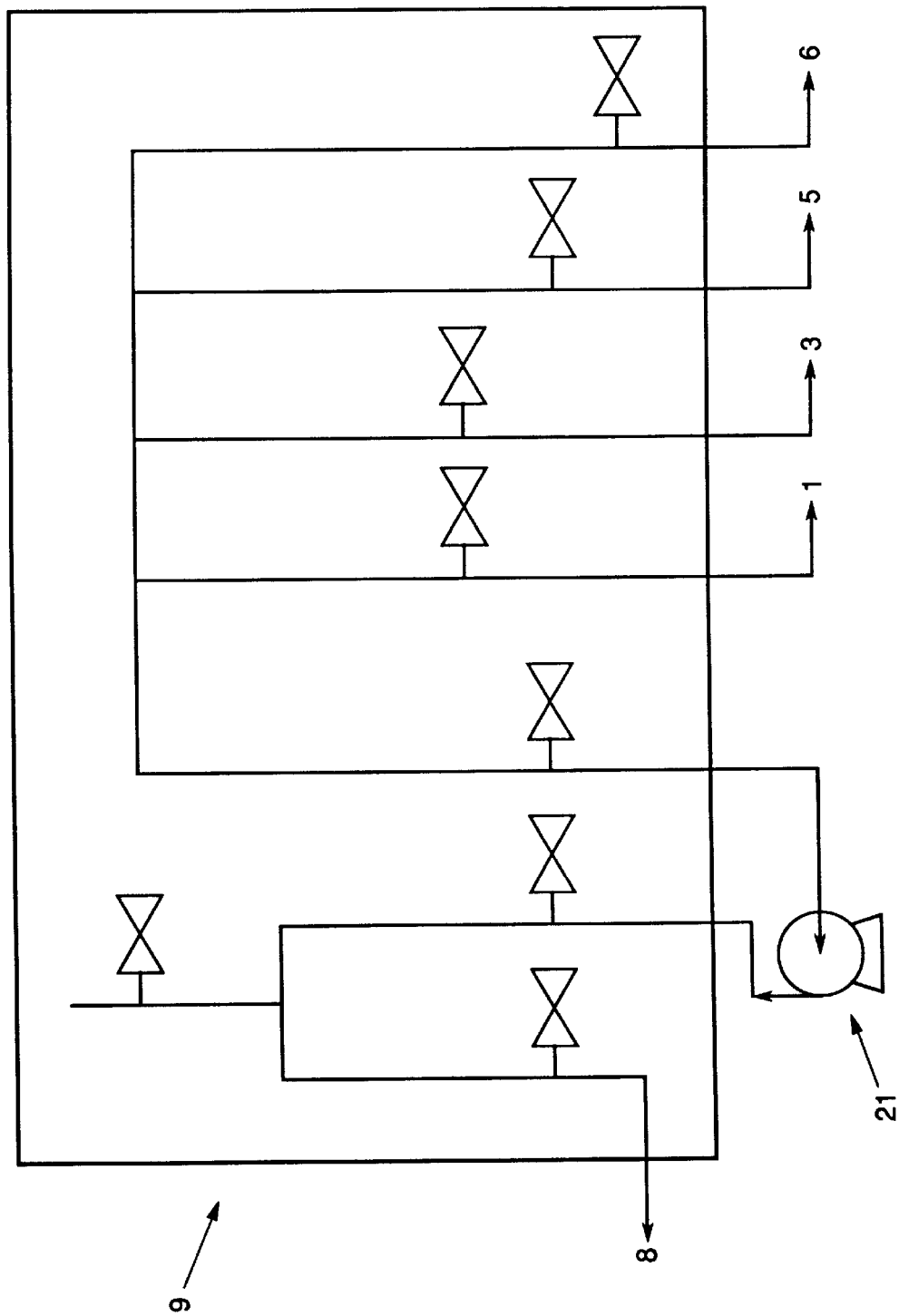
FIG. 2 diagrammatically shows a tap block for controlling the supply of liquids.

All the liquids are pumped with the same hose pump 21. The supply of the liquids is controlled by a tap block 9 (FIG. 2). The supply conduits are permanently connected to the tap block 9.

Vessel 1 contains the pickling acid to be treated, which has the following composition:

| | Concentration [g/l] |
|---|---|
| Hydrochloric acid | 20–130 |
| Iron | 50–200 |
| Zinc | 3–20 |

The removal of zinc from pickling acid by means of the ion exchanger takes place in four steps, loading, rinse (1), stripping and rinse (2). All the steps except stripping are carried out according to the "once through" principle. Stripping takes place according to a recirculating system.

The column 8 was loaded by pumping pickling acid from the top to the bottom through the column 8. The first bed volume present in the column 8 was rinsing liquid (2) from the preceding charge. This volume was pumped to the collecting vessel 7. After one bed volume of pickling acid had been pumped through, the outgoing flow was changed over to the collecting vessel of the feed. The treated pickling acid was collected in vessel 2. The quantity of the pickling acid to be treated depends on the initial concentration of zinc in the pickling acid. The loading rate was 1.5 liters per minute and depends on the size of the column. The outgoing flow of column 8 was monitored in the usual manner for the presence of zinc ions. As soon as the [Zn] noticeably increased, loading was stopped.

The object of rinse (1) is to remove iron from the column. This proved to be necessary because iron precipitated when it came in contact with the stripping liquid.

After loading the column was therefore rinsed with 3 N Hcl. This rinse was carried out from the top to the bottom. The first bed volume present in the column was loading liquid. During rinse (1) the first bed volume was pumped to the collecting vessel 2 of the treated pickling acid. After a bed volume of rinsing liquid had been pumped through, the outgoing flow was changed over to the collecting vessel 4 of rinse (1). Of rinse (1) 1.1 bed volume was required to expel all the iron from the column. Here the rinse throughput was 1.5 liters per minute. After the rinse the column was pumped out at the same pumping rate. The liquid passed to collecting vessel 4 of rinse (1).

The object of stripping is to remove the zinc from the column and to regenerate the column. Stripping took place in the column from the bottom to the top. The stripping liquid which had left the column at the top side was pumped back to the stripping feed vessel 5. During stripping the vessel was continuously stirred. The ingoing flow was filtered with a filtering candle to collect any precipitated iron hydroxide particles. The stripping throughput was 3.0 liters per minute. There was stripped for 3 hours. After stripping the column was pumped out.

At the start of the first charge the stripping liquid consisted of a 25% ammonia solution. At each charge this solution was partly neutralized by the acid from rinse (1). The maximum solubility of zinc in the stripping solution is shown in FIG. 3. When this maximum solubility has been reached, the stripping solution must be changed.

The object of rinse 2 is to remove the stripping liquid. The stripping liquid is not allowed to contaminate with pickling liquid.

After stripping there was rinsed with mains water. This rinse was carried out in the column from the bottom to the top. The rinse throughput was 1.5 liters per minute. For the second rinse two bed volumes were used. At the end of rinse 2 a bed volume of rinsing liquid was present in the column. This bed volume left the column when the next charge was loaded.

During all the process stages the outgoing flow was sampled and analyzed in the known manner. Of all the phases the feeding and collecting vessel was sampled.

The analyses carried out (+) are shown below.

| | Zinc Ammonia | Hydrochloric acid | Iron | |
|---|---|---|---|---|
| Loading | + | + | + | + |
| Rinse 1 | + | + | + | |
| Stripping | + | + | | + |
| Rinse 2 | + | | | + |

The removal of zinc from pickling acid by means of ion exchange resulted in a number of partial flows. These partial flows can be processed within the galvanizing plant, provided the total volume is not too large. The maximum of partial flows that can be processed within the galvanizing plant depends on a number of factors. The most important are:

Temperature of the baths to be used in the galvanizing process (evaporation of the baths), Drawing over liquid from the vessels (amount of material to be galvanized).

The liquid collected from rinse (1) contained acid (3 N HCl), iron and zinc. With this liquid the pickling baths could be strengthened. If required, the liquid collected from rinse (1) can be made zinc-free by means of the ion exchanger.

The liquid collected from rinse (2) contained ammonia and zinc. This can be used to compensate the evaporation losses in the flux vessel.

What is claimed is:

1. A method of selectively removing zinc from an acidic pickling bath effluent comprising metal ions, wherein the acidic effluent is passed over an anion exchange column, which column is in its $OH^-$ form before loading, under conditions at which negatively charged zinc complexes are absorbed to the column material producing a metal containing through flow and at which the zinc complex-loaded anion exchange column is first rinsed with an acidic rinsing liquid having a low stripping capacity so that zinc complexes substantially remain in the column and subsequently stripped with ammonia producing a zinc-containing solution.

2. A method according to claim 1, wherein said acidic effluent is a chloride-containing effluent.

3. A method according to claim 1, wherein as column material a material is used which comprises tertiary and/or quaternary amines as functional groups.

4. A method according to claim 1, which is carried out at a temperature of 37° C. or more.

5. A method according to claim 1, wherein the metal-containing through flow liquid is used in a pickling bath of a galvanizing process.

6. A method according to claim 1, wherein the zinc-containing stripping solution is used in a flux bath in a dry galvanizing bath.

7. A method according to claim 1, wherein the effluent passing step is carried out at a temperature of between about 37 and 70° C.

8. A method according to claim 1, wherein said column is first drained before rinsing.

9. A method according to claim 1, wherein said ammonia is provided in a solution comprising at least 8 molar ammonia.

10. A method according to claim 1, wherein said acidic rinsing liquid is a hydrochloric solution.

11. The method according to claim 10, wherein said hydrochloric solution is an aqueous 3–4 molar HCl solution.

12. The method according to claim 10, wherein said hydrochloric solution comprises 3 molar HCl.

13. A method for selectively removing zinc ions from an acidic effluent which comprises:

passing the acidic effluent which contains zinc ions over an anion exchange column, which column is in its $OH^-$ form before loading, to form negatively charged zinc complexes and to adsorb such complexes onto the column material;

rinsing the anion exchange column with an acidic rinsing liquid having a low stripping capacity so that zinc complexes substantially remain in the column; and stripping zinc ions from the zinc-complex loaded column material with a liquid that contains ammonia to form zinc-ammonia complexes that are removed from the column with the stripping liquid;

wherein the acidic effluent passing step is carried out at a temperature of between about 37 and 70° C.

14. The method according to claim 13, wherein said acidic rinsing liquid comprises 3 molar HCl.

15. The method according to claim 13, wherein said acidic rinsing liquid is an aqueous 3–4 molar HCl solution.

16. The method according to claim 13, wherein said liquid that contains ammonia comprises 8 M ammonia.

* * * * *